(12) United States Patent
Göbbels et al.

(10) Patent No.: US 12,515,882 B2
(45) Date of Patent: Jan. 6, 2026

(54) APPARATUS FOR ROTATING TEXTILE OBJECTS SUSPENDED ON TRANSPORT BRACKETS, IN PARTICULAR ITEMS OF CLOTHING

(71) Applicant: Herbert Kannegiesser GmbH, Vlotho (DE)

(72) Inventors: Peter Göbbels, Kissing (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 68 days.

(21) Appl. No.: 18/606,638

(22) Filed: Mar. 15, 2024

(65) Prior Publication Data

US 2024/0317501 A1   Sep. 26, 2024

(30) Foreign Application Priority Data

Mar. 23, 2023   (DE) ...................... 10 2023 107 370.2
Jun. 13, 2023   (DE) ...................... 10 2023 115 378.1

(51) Int. Cl.
| | |
|---|---|
| *B65G 17/16* | (2006.01) |
| *B65G 17/20* | (2006.01) |
| *B65G 47/244* | (2006.01) |

(52) U.S. Cl.
CPC ............ *B65G 17/16* (2013.01); *B65G 17/20* (2013.01); *B65G 47/244* (2013.01); *B65G 2201/0229* (2013.01)

(58) Field of Classification Search
CPC ...... B65G 17/16; B65G 17/20; B65G 47/244; B65G 2201/0229

USPC .......................................................... 198/680
See application file for complete search history.

(56) References Cited

U.S. PATENT DOCUMENTS

| | | | |
|---|---|---|---|
| 3,684,078 A * | 8/1972 | Nielsen ................ | B65G 17/485 198/377.01 |
| 4,180,152 A | 12/1979 | Sefcik | |
| 5,799,769 A * | 9/1998 | Heer .................... | B65G 19/025 198/465.4 |
| 8,267,241 B2 * | 9/2012 | den Boer ........... | A22C 21/0007 198/679 |

(Continued)

FOREIGN PATENT DOCUMENTS

| | | | | |
|---|---|---|---|---|
| CH | | 713405 A2 * | 7/2018 | ............. B65G 47/61 |
| DE | 197 23 571 C1 | | 10/1998 | |

(Continued)

*Primary Examiner* — James R Bidwell
(74) *Attorney, Agent, or Firm* — Oliff PLC

(57) ABSTRACT

An apparatus which has rotatable carrier hooks wherein, the rotation is carried out in this instance in a selectively controlled manner when moving the carrier hook with items of clothing suspended on the transport bracket past at least one fixed control path. When items of clothing are transported in a state suspended on transport brackets through laundries and also manufacturing plants, the transport brackets with the items of clothing suspended thereon must occasionally be rotated or turned in order to be able to read data carriers of the items of clothing and/or the transport brackets or to orientate all the transport brackets with the items of clothing suspended thereon in an identical manner. To this end, at least one apparatus which is integrated in the respective conveyor path for rotating items of clothing suspended on transport brackets is used.

13 Claims, 10 Drawing Sheets

(56) References Cited

Figure 1:
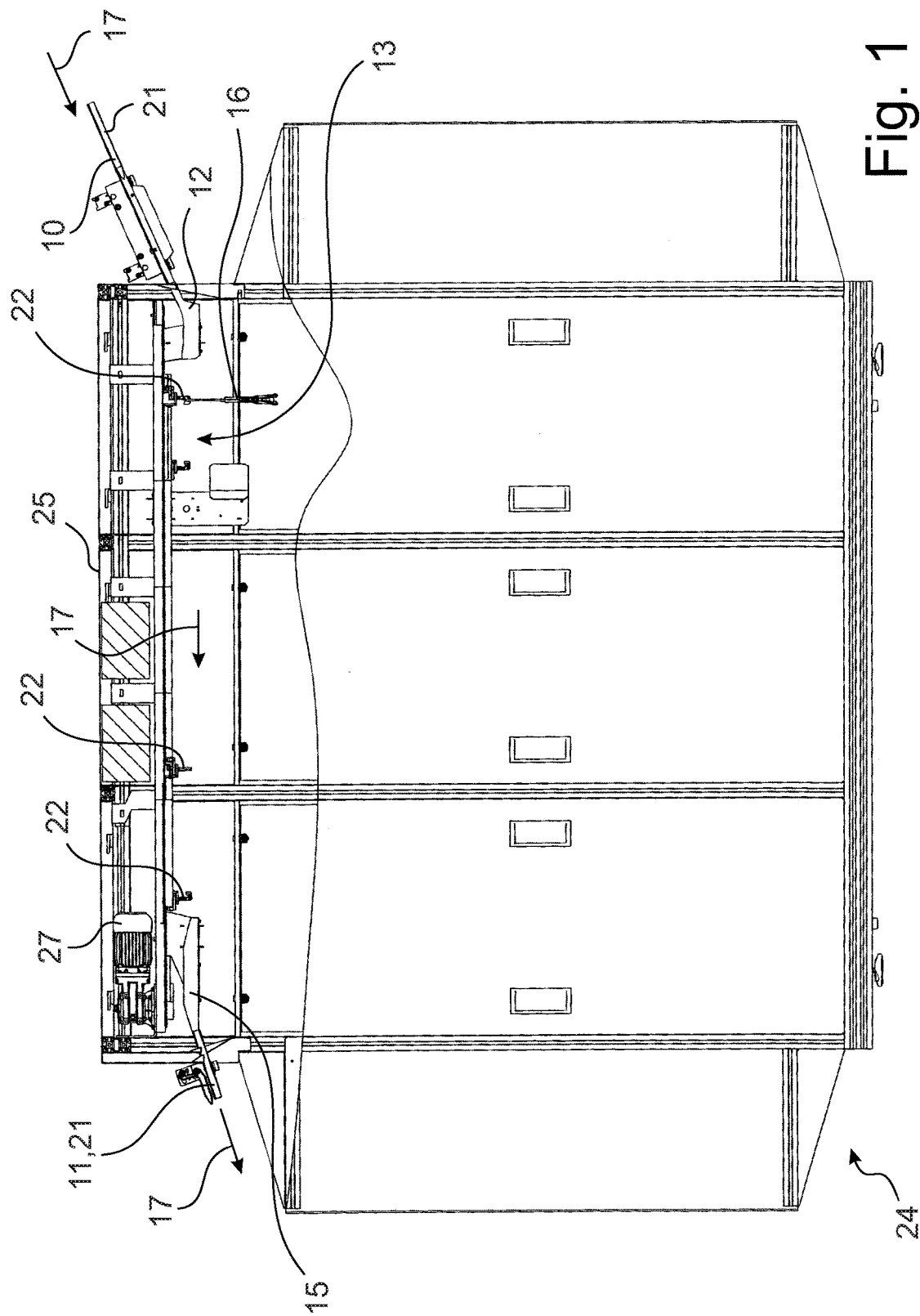

U.S. PATENT DOCUMENTS 8,684,431 B2 * 4/2014 Setozaki ............... B65B 43/465
198/465.4
8,757,354 B2 * 6/2014 Hazenbroek ........... B65G 17/20
198/465.4

FOREIGN PATENT DOCUMENTS

| DE | 200 09 715 U1 | 1/2001 |
|----|---------------|--------|
| EP | 1 651 549 B1 | 12/2006 |
| EP | 2 560 497 B1 | 7/2017 |
| JP | S51-163280 U | 12/1976 |
| JP | S64-21131 U | 2/1989 |
| JP | H02-4472 A | 1/1990 |
| JP | H06-1319 A | 1/1994 |
| JP | 3030668 B2 | 4/2000 |
| JP | 2001-079464 A | 3/2001 |

* cited by examiner

APPARATUS FOR ROTATING TEXTILE OBJECTS SUSPENDED ON TRANSPORT BRACKETS, IN PARTICULAR ITEMS OF CLOTHING

The invention relates to an apparatus for rotating textile objects suspended on transport brackets, in particular items of clothing. The invention further relates to an apparatus for rotating, preferably turning, textile objects which are suspended on transport brackets, in particular items of clothing.

Textile objects, in particular items of clothing of different types, are transported through laundries and also manufacturing plants in a state suspended on transport brackets. Generally, transport brackets are suspended with their bracket hooks on rails. The rails follow the path of a conveyor path. Along the rails, the transport brackets with the items of clothing suspended thereon are either transported onward by means of gravitational force on downwardly inclined rails or moved onward by means of carriers on a conveyor path which is driven in the transport direction.

It is known to provide the textile objects and/or the transport brackets with data carriers which can be read in a contactless manner, for example, chips which can be read in an electronic manner, but also optoelectronically readable barcodes or QR codes. It is then necessary to provide at least one reading station along the conveyor path. Whilst the transport brackets with the textile objects suspended thereon for reasons of space are generally transported through the laundry or the disinfection plant in a state orientated transversely relative to the transport direction, it is necessary in reading stations to reorientate the transport brackets with the items of washing suspended thereon, in particular to rotate them, in such a manner that they extend longitudinally relative to the transport direction.

For specific treatments of the textile objects in laundries and also manufacturing plants, it is necessary for all items of laundry to be orientated in the same manner by the front sides, for example closure bars, of the textile objects facing in the same direction, in particular being located at the front or leading with respect to the transport direction. For example, the textile objects for folding, in particular for automatic folding, must always be orientated in the same manner so that the front sides, particularly the closure sides, of items of clothing are always located at the top after folding. Occasionally, however, individual items of clothing in the sequence of successive items of clothing suspended on transport brackets may be orientated differently, for example, by the front side not leading in the transport direction, but instead the rear side. In order to produce the desired identical orientation, for example, in front of folding stations, it is known to integrate in the conveyor path apparatuses for rotating, more precisely for turning, incorrectly orientated transport brackets with items of laundry suspended thereon.

An object of the invention is to provide apparatuses which carry out in a simple manner a reliable rotation and/or turning of textile objects suspended on transport brackets, in particular items of clothing.

An apparatus for achieving this objective has the features described. In this apparatus, there is provision for at least one carrier, preferably a plurality of carrier hooks which follow each other with spacing, to be rotatably secured to a conveyor path and for the or each carrier hook to be provided with a rotary member which is used for rotation and which corresponds to at least one fixed guide, guiding line or guide path and/or at least one control path which is formed thereon. Preferably, the or each carrier hook is supported with at least one contact location and/or a scanning means of the rotary member thereof on the respective fixed guiding line, in particular at least one control path thereof.

By scanning the extent of the or the respective control path on or along the or each guiding line which extends in a transport direction or the or each guide, there is brought about at least one rotation of the respective carrier hook with the transport bracket suspended thereon together with the item of clothing. Preferably, a plurality of rotations are carried out at different successive locations of the guide or guide path. The circumference and the speed of the rotation are controlled by the extent of the control path during further transport of the carrier hook with the transport bracket and the item of clothing which is suspended thereon in the transport direction.

Preferably, there is provision for the respective carrier hook to be arranged so as to be able to be freely rotated about a rotation axis in a bearing housing which is associated with the conveyor path. The bearing housing may be secured to the conveyor path. The rotation axis may have a vertical, upright and/or perpendicular path. As a result of the rotation of the respective carrier hook, the transport brackets with the item of clothing suspended thereon can be rotated about the rotation axis of the carrier hook.

Preferably, the rotating member has a disk-like body. The disk-like body is preferably connected to the carrier hook in a non-rotatable manner or formed as part thereof. In the simplest case, it may be a ring or frame which is arranged concentrically around the rotation axis. Preferably, the disk-like member extends only partially around the rotation axis, only to the extent of the desired rotation angle. The outer circumference of the disk-like member corresponds directly or indirectly to the at least one control path.

In particular, there is provision, as a result of the structure and/or configuration of the at least one control path, which is preferably associated with the guide or the guiding line or is part thereof, for the speed, the circumference and/or the rotation angle of the carrier hook to be determined or predetermined in accordance with the requirements. Preferably, there is provision for the rotation range of the carrier hook to extend through the at least one correspondingly constructed control path over at least 90°, preferably by 90°, in order to bring the transport bracket suspended on the carrier hook into a lying position with the item of clothing or through 180° in order to turn the transport bracket with the item of clothing. As a result of a rotation through 90°, the transport bracket with the item of laundry suspended thereon can be changed from an orientation transverse with respect to the transport direction into an orientation which extends in the transport direction. Preferably, after the reading operation, the carrier hook is rotated back through 90° again or alternatively further rotated through 90°. The latter would lead to complete turning of the transport bracket with the item of clothing suspended thereon.

According to an advantageous embodiment of the apparatus, there is provision for the disk-like member which may also only be in the form of a part-disk, to be associated with a plurality of scanning means and/or contact locations which are distributed over the rotation range of the carrier hook. Preferably, different and/or alternately other scanning means and/or contact locations scan the at least one guiding line, in particular its control path or a plurality of, preferably two control paths which are located one above the other and/or sliding profiles thereof or thereon. When moving along the respective carrier hook in the transport direction along the guiding line and/or the at least one control path thereof, in particular a sliding profile thereof, as a result of the disk-like member the carrier hook with the transport bracket and the item of clothing is then rotated to the extent predetermined by the configuration, the profile and/or the length of the or the respective control path.

Preferably, the scanning means and/or contact locations are formed at the outer side on the disk-like or part-disk-like member as freely rotatable support members and/or, for example, rollers which are supported on plain bearings or roller bearings and the outer cylindrical covering faces of which roll during onward transport of the respective carrier hook on the at least one control path and scan the at least one control path in so doing.

It is particularly advantageous when the or each carrier hook is pretensioned in a rotating manner about the rotation axis thereof. This pretensioning is in particular directed in such a manner that at least one contact location and/or at least one scanning means at the outer side on the disk-like member presses against the respective guide path which is associated therewith and/or the at least one control path. It is thereby ensured that, when moving along the carrier hook on the or each control path, the at least one scanning means which is in contact therewith at the time and/or the support member of the disk-like member of the rotating member can follow the curved extent of the respective control path in a reliable and precise manner.

The at least one scanning means and/or the support member which is resiliently pressed against the control path and/or the sliding profile thereof can rotate the transport bracket which is transported onward in the transport direction together with the item of clothing or other textile object in a selective manner. The rotation is carried out at a desired speed which ensures that the item of clothing which is suspended with the transport bracket on the carrier hook remains safely suspended on the carrier hook during all phases of the rotation and does not carry out any uncontrolled vibrations which in an extreme case could lead to the item of clothing falling from the transport bracket.

According to a preferred embodiment of the apparatus, the guides, guiding lines and/or the control paths are arranged in a fixed manner extending parallel beside a portion of the conveyor path which drives the carrier hooks in the transport direction. The at least one guide, the at least one guiding line, and preferably also the at least one control path follow the extent of the conveyor path in a transport direction, whereby the control path may have a length which is sufficient to rotate the respective carrier hook over the desired angular range and where applicable also to rotate back over the same angular range again, for example, after the data carrier of the textile object and/or the transport bracket which carries it have been read in a contactless manner.

Another apparatus for achieving the objective mentioned in the introduction has the features described. With this apparatus, there is provision for the carrier hook to be rotatingly secured to a sliding member and during a movement of the carrier hook from a transfer position into a discharge position, for the transport bracket which is suspended thereon together with the textile object which is suspended thereon to be subjected by means of at least one rotary member and/or a control path to a selectively guided rotation. Furthermore, during the reverse movement of the preferably empty carrier hook from the discharge position back into the transfer position, the carrier hook can be rotated backward. In this manner, a precise rotation of the carrier hook in the opposing direction can be carried out and by scanning the control path the rotation angle and the rotation speed can be predetermined in accordance with requirements. Any rotation angles can be produced by the control path. Preferably, the possible rotation angles are between 90° and 180°. For turning a textile object, a rotation angle of 180° is provided.

Preferably, the sliding member with the carrier hook secured thereto can be displaced, preferably moved back and forth in translation, on a fixed, preferably linear guide rail between the transfer position and the discharge position. With reference to this displacement path, by scanning a corresponding extent of the control curve, the rotation of the carrier hook is carried out. This movement is carried out in the transport direction with the transport bracket which is suspended thereon and on which a textile object is pressed and transported back in the empty state counter to the transport direction.

According to a further development of the apparatus, there is provision for the carrier hook to be freely rotatably supported in a bearing housing which is securely arranged on the sliding member about a preferably vertical rotation axis. The carrier hook is thereby moved further in the transport direction by the sliding member and during this movement, for rotation, in particular turning the textile object, is additionally rotated about the vertical rotation axis thereof. This rotation is brought about by at least one control path of a guide.

The drive of the sliding member is carried out in an advantageous embodiment of the apparatus by a linear drive. The linear drive may be a pneumatic cylinder, a shuttle cylinder, a spindle drive, a toothed rack drive or also a belt drive. All of these drives mentioned enable onward transport of the sliding member on a linear and/or translational path in the transport direction.

The apparatus may be further developed in such a manner that the control path is formed by a groove in the guide which is preferably in the form of a guiding plate. The rotary member which serves to rotate and/or turn the carrier hook may correspond to the groove. This may be in such a manner that a support member or scanning projection of the rotary member of the carrier hook scans the groove and/or control path during translational onward transport of the carrier hook in the transport direction and the rotation, in particular the turning, of the carrier hook is thereby controlled in a selective manner.

Preferably, there is provision for the control path, in particular the groove which thus forms it, to have two groove portions which are preferably both in the form of 90° curves and which are arranged in a mirror-symmetrical manner with respect to each other. The 90° curves which form the groove portions do not necessarily have to have an identical extent. Different extents are also conceivable. The decisive aspect is that both groove portions extend over an angular range of 90° so that the carrier hook together with the transport bracket and item of clothing can be rotated through a total of 180° and the item of clothing is consequently turned.

Preferably, there is provision for the two groove portions which are arranged in a mirror-symmetrical manner to meet at the highest locations thereof directed toward each other. In particular, the two groove portions which are arranged in a mirror-symmetrical manner with respect to each other merge into each other at a highest location of the groove. Alternatively or additionally, the groove portions may also be connected to each other at the ends thereof directed toward each other. The groove portions not only meet at the ends thereof directed toward each other but also merge into each other at this location and are thus connected to each other in a seamless manner.

As a result of the control path, the rotational movement of the carrier hooks can be controlled in a selective manner by the groove comprising the two groove portions. As a result of the extent, in particular the rising, of the groove, the speed at which the carrier hook, in particular with the transport bracket and textile object which is suspended thereon, is currently rotated, is individually predetermined.

Another advantageous further development of the apparatus makes provision for the carrier hook to preferably have at the free upper end thereof a rotary arm for rotating the carrier hook abut the rotation axis thereof. The rotary arm is connected to the carrier hook in a non-rotatable manner. A free end of the rotary arm corresponds to the control path, in particular of the groove in the guide plate, whereby, when the carrier hook is transported further in the transport direction, the rotary arm is pivoted and in this instance a rotational movement is applied to the carrier hook by the rotary arm and/or controlled.

Preferably, a free end of the rotary arm has an in particular upright scanning projection. This scanning projection is configured for engagement in the control path, preferably the groove thereof. The scanning projection can thereby be supported on or in the control path, preferably the groove thereof, and when the carrier hook is moved onward in the transport direction can slide on and/or in the groove.

The carrier hook and thereby the transport bracket which is suspended thereon are rotated, preferably turned, in accordance with the extent of the groove by the rotary arm which is guided in the groove and/or control path and in this instance the carrier hook is caused to move in a rotational movement about the rotation axis thereof.

The scanning projection may be a pin which engages in the control path, in particular the groove thereof, or also a bearing, for example, a roller or plain bearing. Such a scanning projection may travel smoothly but without jamming, preferably in a play-free or virtually play-free manner, in the groove and in this instance scan or travel along the groove, in particular the extent thereof.

Figure 2:
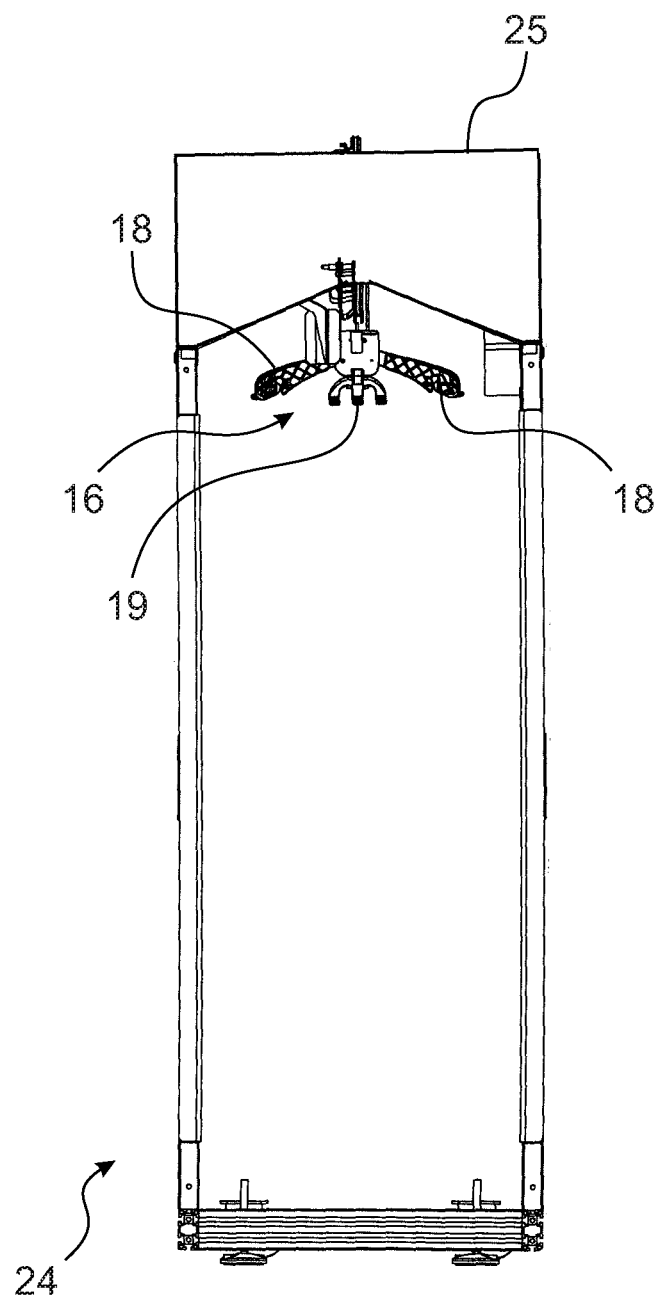
Figure 3:
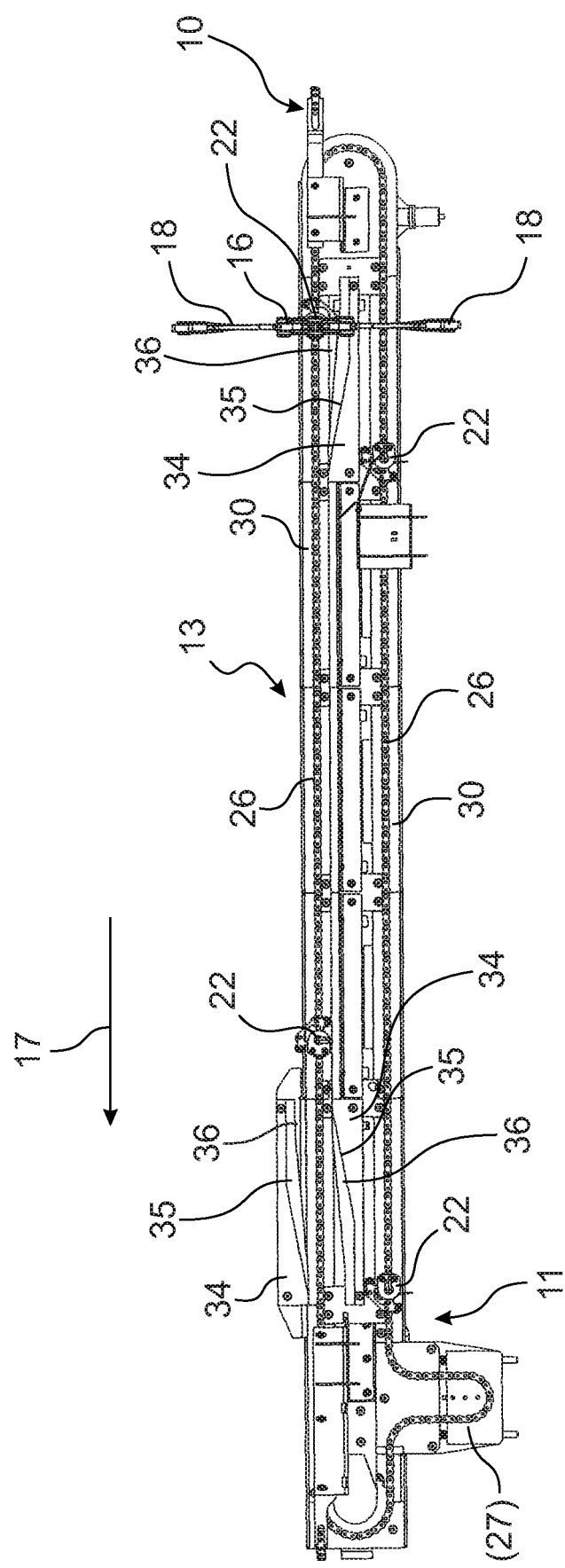
Figure 4:
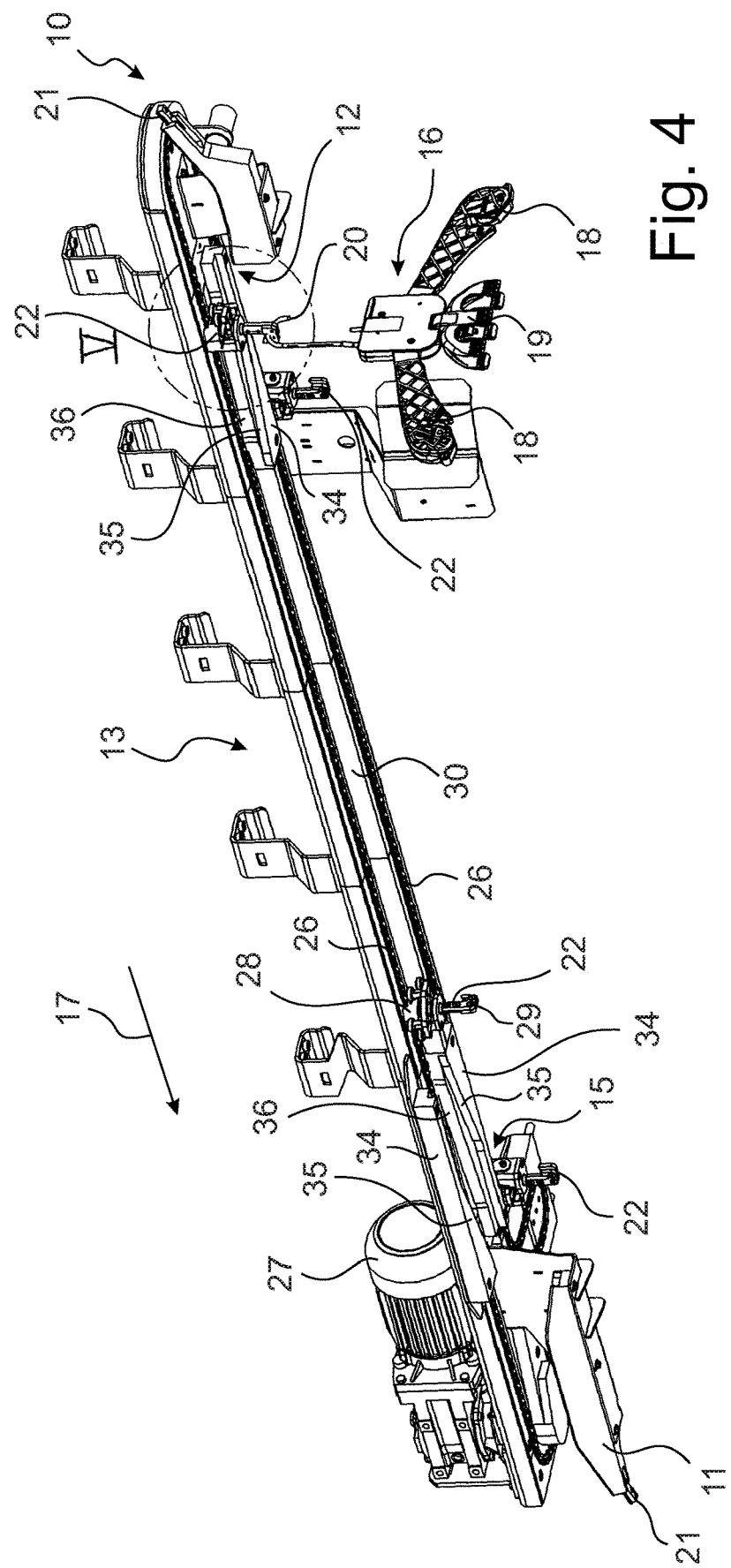
Figure 5:
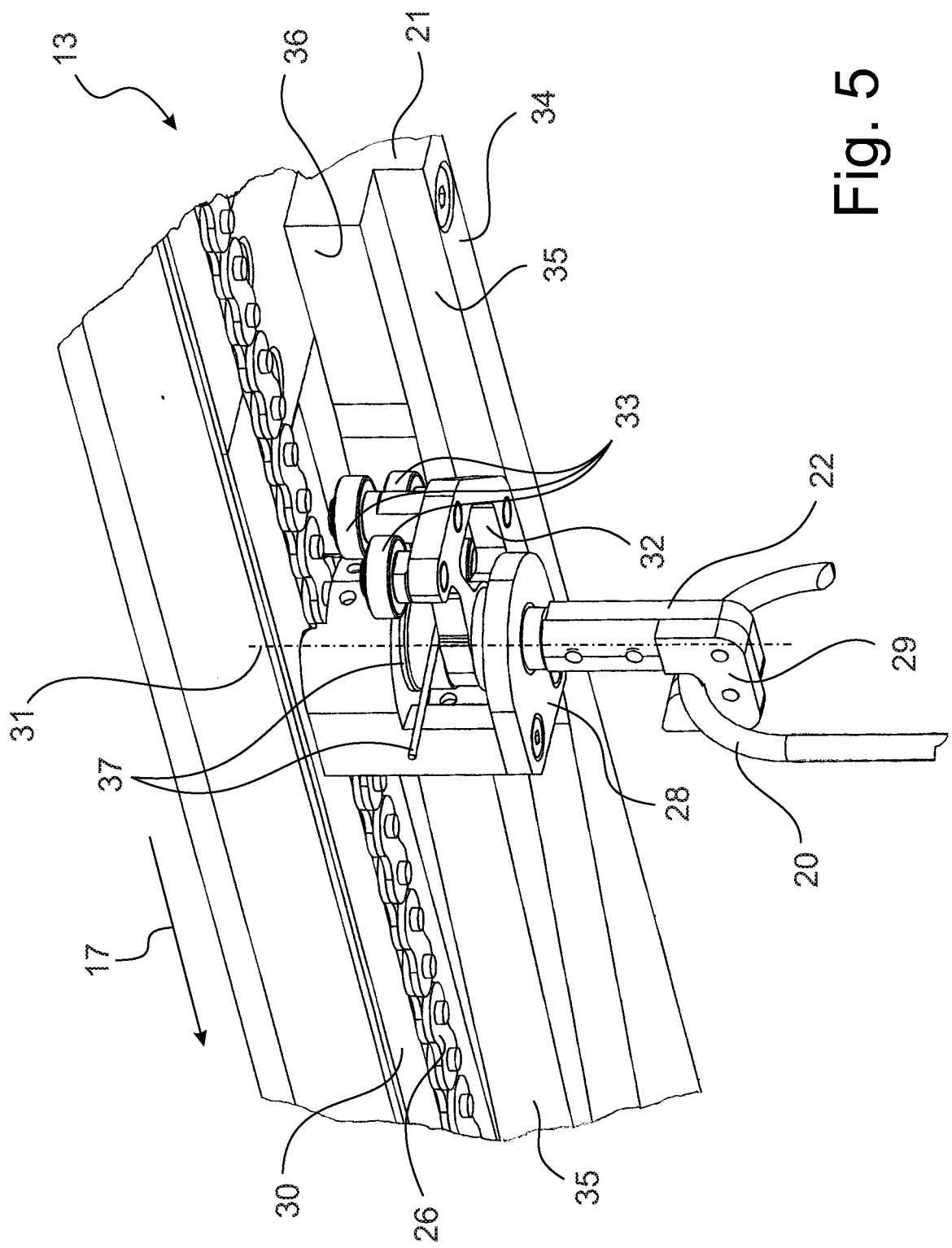
Figure 6:
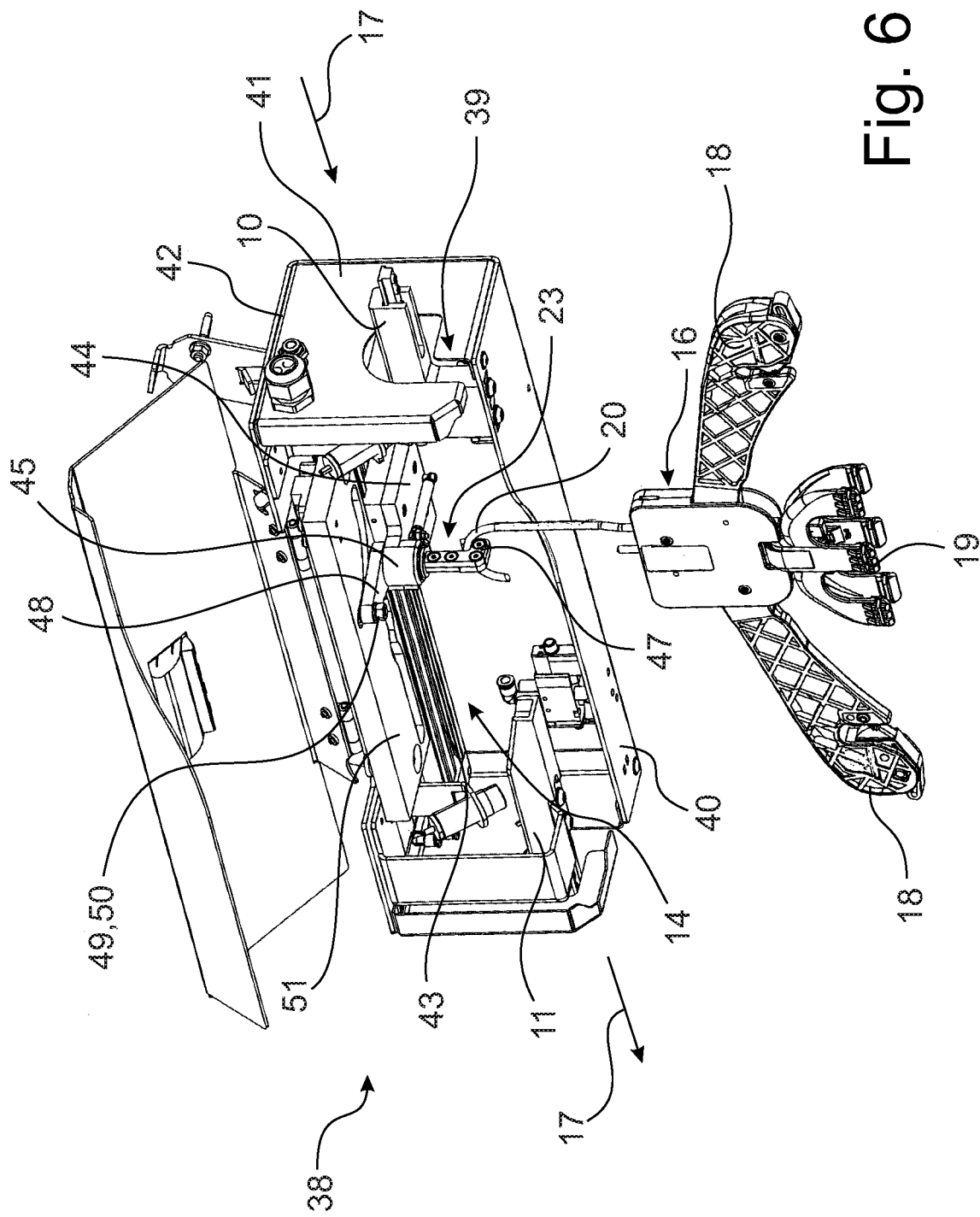
Figure 7:
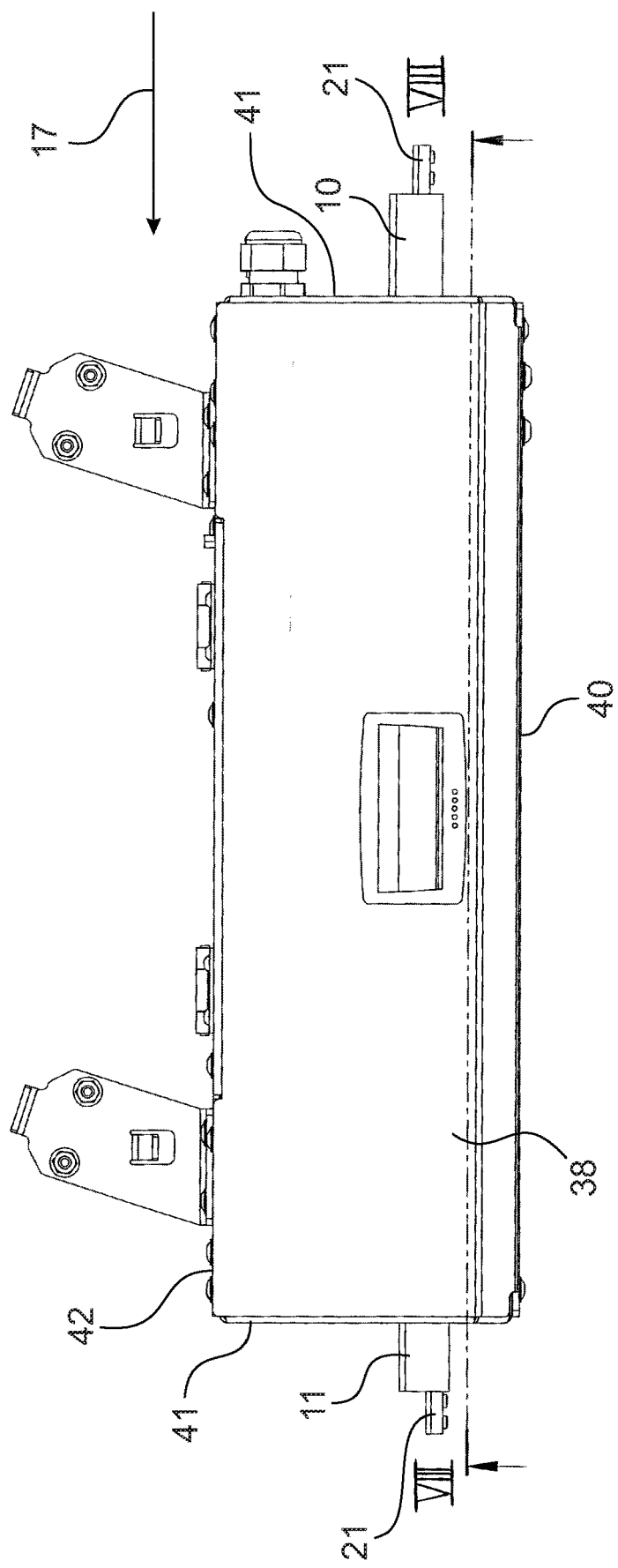
Figure 8:
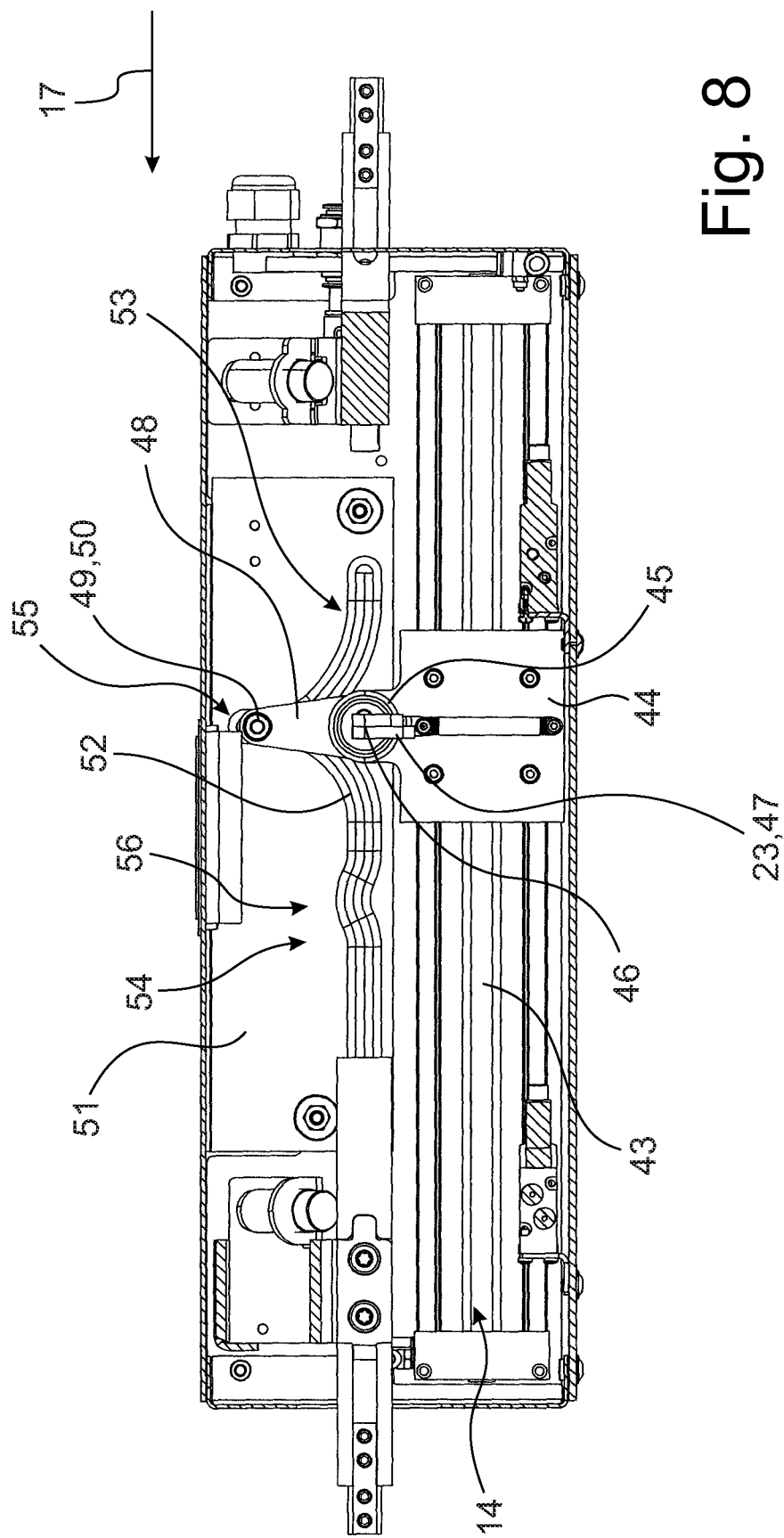
Figure 9:
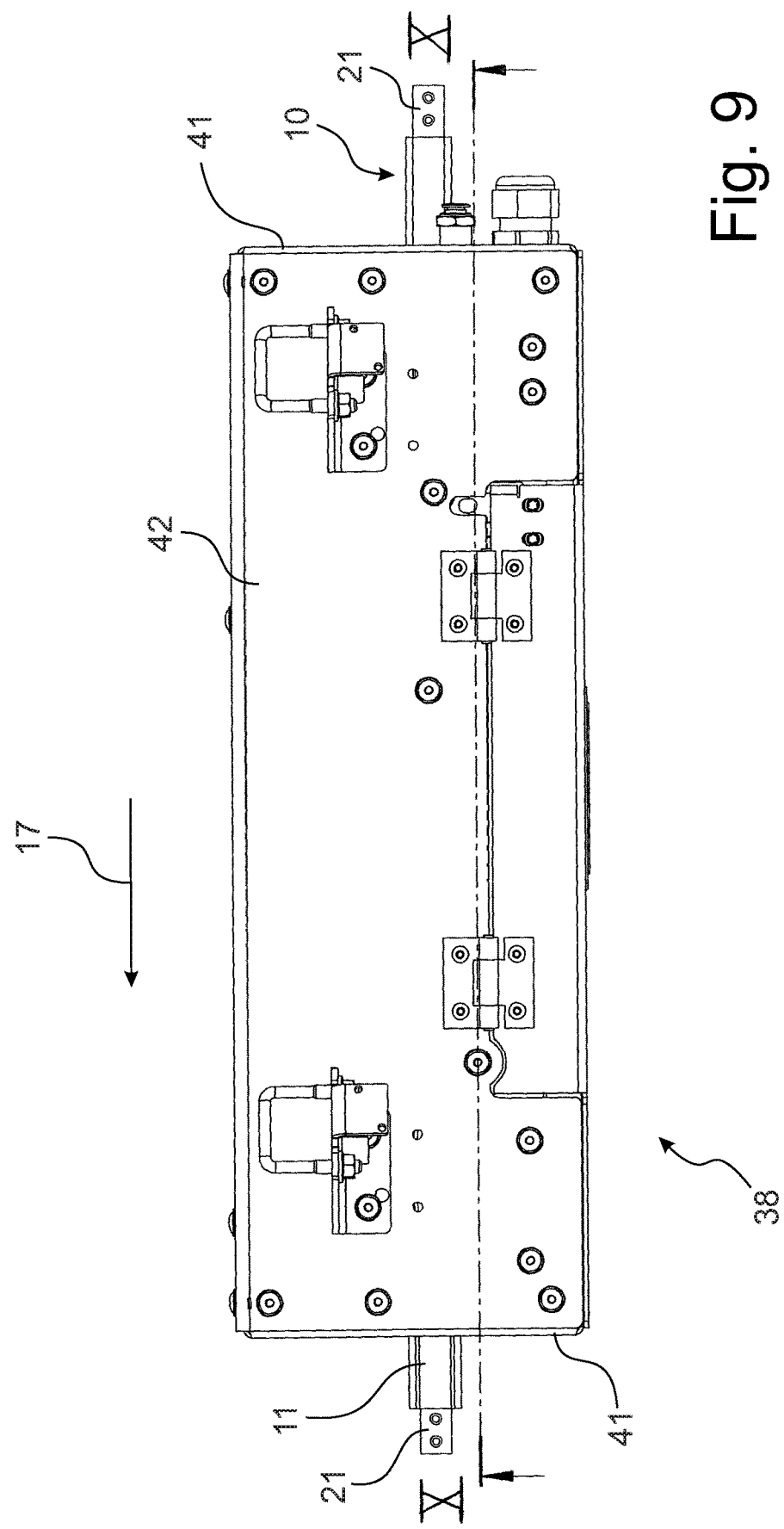
Figure 10:
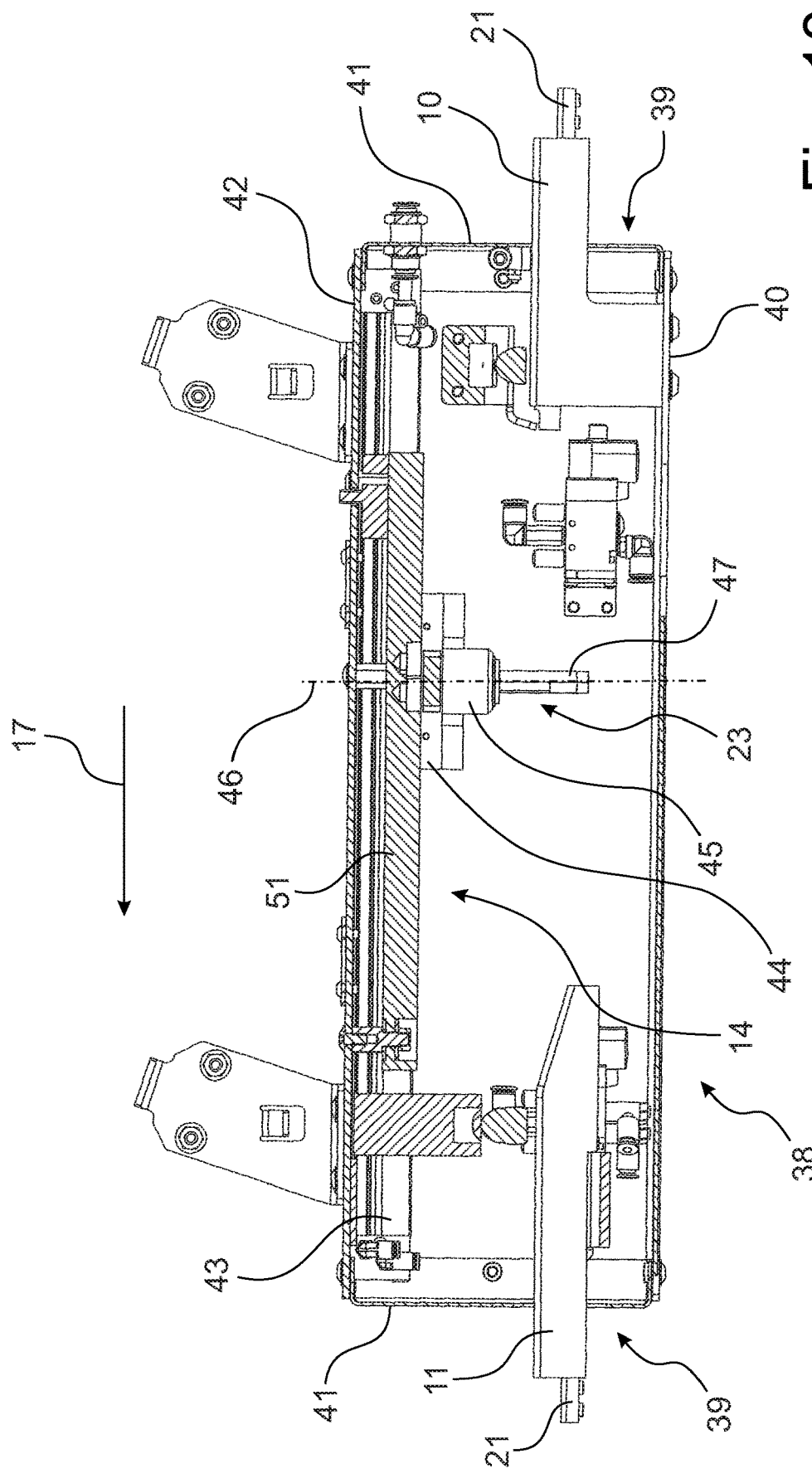

Preferred exemplary embodiments of apparatuses according to the invention will be explained in greater detail below with reference to the drawings, in which:

FIG. 1 shows a side view, which is sectioned in the upper region, of a first apparatus, FIG. 2 shows a cross section through the apparatus of FIG. 1, FIG. 3 shows a conveyor of the apparatus of FIGS. 1 and 2 in a view from below, FIG. 4 shows a perspective illustration of the conveyor of FIG. 3, FIG. 5 shows a detail V from FIG. 4, FIG. 6 shows a perspective view of a second apparatus with the housing open, FIG. 7 shows a side view of the apparatus of FIG. 6, FIG. 8 shows a section VIII-VIII through the second apparatus illustrated in FIG. 7, FIG. 9 shows a plan view of the apparatus of FIGS. 6 to 8, and FIG. 10 shows a section X-X through the second apparatus illustrated in FIG. 9.

The apparatuses shown in the Figures are arranged in a conveyor path. Both apparatuses may be arranged at different locations of the same conveyor path, but in each case also one apparatus in an individual conveyor path. The respective apparatus is integrated in a single conveyor path or different conveyor paths in such a manner that they form a short part-portion thereof.

In the Figures, in particular in FIGS. 1 and 6, only opposing end regions, that is to say, an inlet end 10 and an outlet end 11 of the conveyor path or conveyor paths which are otherwise not illustrated are shown. The inlet end 10 of the conveyor path is adjoined by a beginning 12 of a conveyor 13 of the apparatus shown in FIGS. 1 to 5 or a conveyor 14 the apparatus shown in FIGS. 6 to 10. One end 15 of the respective conveyor 13 or 14 is adjoined by the opposing outlet end 11 of the conveyor path which is not shown.

Along the conveyor path which is not fully shown and by means of the apparatuses shown in the Figures, textile objects which are suspended on transport brackets 16 and which are not illustrated are transported to different work stations, processing stations and/or treatment stations of laundries or manufacturing plants. The textile objects may preferably be so-called molded components, items of clothing, items of work clothing or the like.

The textile objects are transported via the inlet end 10 of the conveyor into the respective apparatus and after passing through the apparatus are transferred again to the opposing outlet end 11 of the conveyor path. In this manner, the textile objects pass through the respective apparatus in the transport direction 17.

In some Figures, for example, FIGS. 2 and 6, transport brackets 16 with folded-out bracket arms 18 are illustrated. An item of clothing is in each case suspended on a transport bracket 16 for treatment in the laundry or in the manufacturing plant with the folded-out bracket arms 18 which are shown in the Figure and thus transported in the transport direction 17 by the apparatuses and also along the conveyor path which is not shown apart from the inlet end 10 and outlet end 11. The transport brackets 16 shown in the Figures also have a clamp 19 which can be opened and closed. This clamp 19 is used to hang on the respective transport brackets 16 textile objects which cannot be hung over the bracket arms 18. For example, trousers can be hung on or below the clamps 19. The transport bracket 16 further has a bracket hook 20. With this bracket hook 20, each transport bracket 16 together with the textile object which is suspended thereon can be hung on a rail 21 of the conveying path. With further movement of the transport brackets 16 in the transport direction 17 with or without a drive, the bracket hooks 20 of the transport brackets 16 slide along the rail 21.

In the apparatus, each transport bracket 16 hangs with the bracket hook 20 thereof on a carrier hook 22 or 23 of the conveyor 13 or 14, respectively.

The first apparatus shown in FIGS. 1 to 5 is configured in order to gradually rotate a transport bracket 16 in each case with the transport bracket suspended thereon together with the textile object several times, preferably in each case twice through 90°. These rotations are carried out in different directions, once through 90° in one direction and another time also through 90° in the opposite direction.

When viewed in the transport direction 17, transport brackets 16 with textile objects suspended thereon gradually reach the region of the beginning 12 of the conveyor 13 of the apparatus, with an orientation which extends transversely relative to the transport direction 17 (FIG. 1). By means of subsequent rotation through 90°, the respective transport bracket 16 with the textile object hanging below is reorientated in such a manner that it extends along and/or parallel with the transport direction 17. Subsequently, the transport bracket 16 with the textile object hanging thereon is rotated again through 90°, preferably rotated back in an opposing rotation direction, so that the respective transport bracket 16 again receives its original orientation extending transversely relative to the transport direction 17. Afterwards, the respective empty carrier hook 22 is transported along a return strand of the conveyor chain 26 counter to the transport direction 17 to the beginning 12 again in order at that location to take up a following transport bracket 16 with a textile object.

However, the invention is not intended to be limited to the above-described sequence of rotations of the carrier hooks 22 and the mentioned rotation angles. Instead, rotation angles and rotary phases different from this are possible.

In the apparatus shown in this instance, the temporary re-orientation of the transport bracket 16 with the textile object suspended thereon serves to present the respective transport bracket 16 with the textile object suspended thereon with an orientation, which extends longitudinally with respect to the transport direction 17, of a reading device which is not shown. The reading device is associated with the apparatus. It may be a component of the apparatus but may also be independent. The reading device reads in an electronic or optoelectronic manner a data carrier in a contactless manner, such as, for example, an electronic chip, barcode or QR code both on the transport bracket 16 and on the textile object which is suspended thereon. However, it is also conceivable for only the respective transport bracket 16 or only the textile object which is suspended thereon to have a data carrier so that the reading device is then configured to read only the data carrier of the transport bracket 16 or the textile object in a contactless manner.

In a housing 24, which is open at least for the most part at opposing end faces, of the apparatus, the conveyor is located below a ceiling 25 of the housing 24 or with a small spacing below the ceiling 25. In FIGS. 3 and 4, this conveyor 13 is illustrated separately. The conveyor is a continuous conveyor having a continuous conveyor path which can be driven circumferentially and which in the exemplary embodiment shown is in the form of a conveyor chain 26, for example, in the form of a roller chain. As a result of a drive 27, for example, an electric motor having a gear mechanism, the conveyor chain 26 can be driven in a circumferential manner so that at least one strand which transports the transport bracket 16 with the items of clothing suspended thereon onward, extends in the transport direction and an opposing strand as a return strand in the opposing direction.

A plurality of preferably identical carrier hooks 22 are arranged on the conveyor chain 26 with preferably identical spacings. Lower ends of the carrier hooks 22 in each case have a preferably bracket-like hanger 29. The transport bracket 16 with the textile object suspended thereon can with the bracket hook 20 be suspended on the hangers 29 of each carrier hook 22.

The conveyor chain 26 runs at least in the region of the two parallel strands thereof in a fixed guiding line 30. This carries at least the linear strands of the conveyor chain 26 and guides them on a linear path in the transport direction 17. The carrier hooks 22 are thus connected to the conveyor chain 26 in such a manner that they are located below the conveyor chain 26 and also below the guiding line 30 (FIG. 5).

The spacings of successive carrier hooks 22 of the conveyor 13 are selected in such a manner that they are larger than the width of the transport bracket 16 which is orientated longitudinally with respect to the transport direction 17 with a textile object which is suspended thereon. Preferably, the carrier hooks 22 have a spacing which corresponds to from 1.2 times to 2 times the width of the respective folded-out transport bracket 16.

Each of the carrier hooks 22 which is configured in an identical manner is supported in a bearing housing 28 so as to be able to be rotated, preferably freely rotated, about a vertical rotation axis 31. Via this bearing housing 28, the respective carrier hook 22 is connected to the conveyor chain 26. This connection is carried out in such a manner that the bearing housing 27 is connected to the conveyor chain 26 in a non-rotatable manner and thus cannot also rotate about the rotation axis 31.

A rotary member 32 is securely connected to the respective carrier hook 22. The rotary member 32 acts in the manner of a lever on the carrier hook 22. This takes place in such a manner that the carrier hook 22 can be rotated about the rotation axis 31 thereof by the rotary member 32. The rotary member 32 is preferably configured in a disk-like manner. In the apparatus which is shown in FIGS. 1 to 5 and with which the respective transport bracket 16 with the textile object suspended thereon is intended to be rotated in phases with 90° steps, thus has to carry out a quarter-circle rotation, the rotary member 32, in particular the disk-like member thereof, is also only configured in a quarter-circle-like manner. The rotary member 32 is then a circle-segment-like or quarter-circle-like member. This member may also be referred to as or form a quarter-circle-like rotary disk.

The circle-segment-like rotary member 32, in particular the quarter-circle-like disk-like member and/or the quarter-circle-like rotary disk, has an outer contour which in principle is guided concentrically around the rotation axis 31 and protrudes outward with respect to the bearing housing 28 over the entire outer contour thereof. In the apparatus shown in this instance, the rotary member 32 is provided at the outer edge with a plurality of scanning means 33. These may also be referred to as support members, support rollers, support bearings and/or contact locations. In the exemplary embodiment shown, the scanning means 33 which are preferably configured in an identical manner are in the form of support bearings which have roller or plain bearings. All the support bearings for forming the scanning means 33 can be freely rotated about spaced-apart, parallel vertical rotation axes which extend parallel with the rotation axis 31 of the respective carrier hook 22 in the bearing housing 28, preferably centers of the rotation axes of the scanning means 33, in particular support bearings, surround the center of the rotation axis 31 with spacing preferably virtually concentrically.

In the exemplary embodiment shown, a total of four identical scanning means 33 are associated with the rotary member 32, in two groups of two scanning means 33 in each case. Each group of two scanning means 33 is located at opposing end regions of the quarter-circle-like outer edge of the rotary member 32. The two scanning means 33, which are preferably in the form of support bearings, of each of the two pairs are displaced in an axial direction of the rotation axes thereof which extend parallel with the rotation axis 31. Each pair of scanning means 33 has a scanning means 33 which is located in a higher plane and a scanning means 33 which is located in a plane below, in particular a support bearing.

These height differences are such that the lower plane of the upper scanning means 33 is located with a preferably small spacing above the lower plane of the lower scanning means 33. Alternatively, it is conceivable for each rotary member 32 to have less than or also more than four scanning means 33 and/or support bearings or support rollers and/or for all the scanning means 33 to be located in a common horizontal plane.

The scanning means 33 of the rotary members 32 of the carrier hooks 22 are associated with fixed bars 34 or alternatively plates which where applicable may be formed in sequential portions in the transport direction 17. In the exemplary embodiment of the apparatus as illustrated particularly in FIGS. 3 and 4, the strand of the conveyor 13 which extends in the transport direction 13, preferably the conveyor chain 26 thereof, is associated with two bars 34, at the beginning 12 and at the end 15. This arrangement is produced in a mirrored manner in such a manner that in the region of each bar 34 the relevant carrier hook 22 is rotated through 90° in the same rotation direction. According to FIGS. 3 and 4, another bar 34 is associated with the return strand for empty carrier hooks 22. This bar serves to rotate the carrier hook 22 back into its original orientation.

The sides of the bars 34 directed toward the scanning means 33, that is to say, the rotary bearings which form them, are configured in such a manner that they form control paths 35 and 36. On these control paths 35 and 36, specific and/or changing scanning means 33 of the rotary member 32 of the respective carrier hook 22 can move along in the transport direction 17 during further movement thereof, that is to say, roll or slide along. The control paths 35 and 36 predetermine a guiding or sliding profile for the scanning means 33 on the rotary members 32 of the carrier hooks 22. Depending on the configuration, in particular the profile, of the control paths 35 and 36, the rotation angle and the rotation speed of the carrier hooks 22 are predetermined.

The bars 34 or rails for forming the control paths 35 and 36 are preferably securely arranged below the guiding line 30 of the conveyor chain 26 (FIG. 5). However, it is also conceivable for the control paths 35 and 36 to be arranged in a fixed manner at different locations of the apparatus.

The plurality of bars 34 preferably each have control paths 35 and 36 with different control profiles or roller paths for the scanning means 33. The upper control path 36 extends parallel with the lower control path 35 (FIGS. 4 and 5). In this instance, the scanning means 33 which are located in a higher plane are associated with the upper control path 36 and the scanning means 33 which are located in the lower plane are associated with the lower control path 35. The scanning means 33 which are arranged higher on the rotary member 32 may thereby run along alternately on the higher control path and the scanning means 33 which are arranged lower on the rotary member 32 can run on the lower control path 35. The control paths 35 and 36 have different extents and/or profiles having in each case sequential portions with alternating inclinations. These inclinations are selected in such a manner that only one scanning means 33 always rolls on the upper control path 36 or lower control path 36. As a result of the different control paths 35 and 36, a harmonious, unconstrained and/or uniform rotation of the carrier hooks 22 on each bar 34 is produced.

Between successive spaced-apart bars 34, the carrier hooks 22 are not rotated by the scanning means 33 of the rotary members 32 thereof.

In the central region of the control path 35, where the transport brackets 16 with the textile objects suspended thereon have obtained and maintain a longitudinally directed orientation, in the apparatus shown in this instance the reading of the data carriers of the respective transport bracket 16 and/or the textile object which is suspended thereon is carried out. However, it is also conceivable that, in the case of the textile object and/or the transport bracket which carries it which has been rotated into a longitudinally directed position, other measures are carried out. For example, the textile object suspended on the transport bracket 16 can be examined for foreign bodies manually or, for example, by means of X-rays.

The reading of the respective data carrier is preferably carried out whilst the conveyor 13 continues to be driven at an in particular uniform transport speed continuously with a carrier hook 22 which is constantly moved further in the transport direction 17 while remaining identical in an uninterrupted manner with transport brackets 16 and textile objects suspended thereon. However, it is also conceivable for the reading to be carried out with a stopped conveyor 13, that is to say, currently fixed transport brackets 16 and textile objects suspended thereon.

In FIG. 5, a spring 37 is partially illustrated. This is preferably a torsion spring. The spring 37 surrounds a portion of the carrier hook 22 which is rotatably supported about the rotation axis 31 in the bearing housing 28. Opposing ends of the spring 37 are supported, on the one hand, on the bearing housing 28 which is securely arranged on the conveyor chain 26 and, on the other hand, on the rotary member 32 and/or the respective carrier hook 22. These ends form resilient arms, one of which is illustrated in FIG. 5.

The spring 37 which is associated in the manner described above with the carrier hook 22, in particular the bearing housing 28 thereof and the rotary member 32, is configured in such a manner that it applies to the rotary member 32 and the carrier hook 22 which is connected thereto in a non-rotational manner a rotational movement in the sense that the at least one scanning means 33 and/or support bearing which is currently located closest to the control path 35 or 36 and which is preferably supporting, is pressed against the control path 35 of the bar 34. As a result of the spring 37, a scanning means 33 of the rotary member 32 during the entire onward transport of the carrier hook 22 with the transport bracket 16 suspended thereon together with the textile object in the transport direction 17 is pressed by the apparatus permanently with pretensioning against the control path 35 or 36. The at least one scanning means 33 which, as a result of the current rotational position of the carrier hook 22, is in contact with the control path 35 or 36 is thereby supported on the control path 35 or 36 of the respective bar 34. The scanning means 33 permanently follow the extent of the control path 35 and 36. At locations where the control paths 35 and 36 are as a result of portions which are curved or which extend obliquely with respect to the transport direction 17, continuously change their spacing with respect to the respective carrier hook 22, changing scanning means 33 with the rotary member 32 being rotated follow the oblique, curved extent of the control path 35 or 36 during the onward transport of the carrier hook 22 in the transport direction 17. The permanent scanning of the control path 35 and 36 by changing scanning means 33 leads to the respective carrier hook 22 being rotated by the rotary member 32 which is connected thereto, whereby the transport bracket 16 with the textile object suspended thereon is also rotated.

The following description relates to the second apparatus shown in FIGS. 6 to 10 for rotating textile objects which are suspended on transport brackets 16 and which are not shown, in particular items of clothing. This apparatus is configured in such a manner that it rotates the transport brackets 16 with the textile objects suspended thereon through 180°. In this instance, the textile objects are turned with the transport brackets 16 through a semi-circular rotation. The turning is carried out so that all the textile objects which are transported onward in a state orientated transversely relative to the transport direction 17 along a conveyor path which is not shown with the transport brackets 16 face with the front side, for example, a button bar, in the same direction, for example, lead in the transport direction 17. With the apparatus, for this reason only those transport brackets 16, in which the front sides do not face in the intended direction, with items of laundry suspended thereon are turned, for example, the button bars thereof, do not lead in the transport direction 17. In order to enable this, the apparatus is preferably arranged in a bypass path with respect to the conveyor path, between rails 21 which are only indicated in FIGS. 6 to 10 and on which the bracket hooks 20 of the transport brackets 16 either slide downward as a result of gravitational force in the transport direction 17 or are moved along the rail 21 by means of carriers which are arranged on a conveyor path which is not illustrated. From the bypass path in which the apparatus is arranged, the rail 21 is then partially removed in order to arrange the apparatus.

The apparatus has a housing 38. The housing 38 is configured in such a manner that only an upper portion of the bracket hook 20 of the transport bracket 16 runs through a slot 39 in the base 40 of the housing 38. The remaining portion of the transport bracket 16, in particular the bracket arms 18 thereof and the textile object which is suspended thereon, is located outside the housing 38, in a state suspended underneath (FIG. 6). Opposing end faces 41 of the housing 38 are at least partially open, wherein the open locations are connected to the ends of the slot 39 so that the portion of the bracket hook 20 of the respective transport bracket 18, which portion is located in the housing 38 of the apparatus, can enter the housing 38 at the inlet end 10 and can be discharged from the housing 38 at the outlet end 11.

Below a ceiling 42 of the housing 38 of the apparatus, a conveyor 14 thereof is secured. This conveyor is not a continuous conveyor which is circumferentially driven as in the apparatus of FIGS. 1 to 5, but instead an intermittent conveyor 14. This conveyor can be moved alternately between the inlet end 10 and the outlet end 11 from a transfer position at the inlet end 10 to a discharge location at the outlet end 11 in the transport direction 17 and can be moved back again in the opposite direction to the transport direction 17. During the movement from the transfer position to the discharge position, the transport bracket 16 with the item of laundry is transported by the conveyor 14 in the transport direction 17 to the outlet end 11. The return movement from the outlet end 11 to the inlet end 10 is carried out with an empty conveyor 14 without a transport bracket 16 suspended thereon.

The intermittent conveyor 14 in the housing 38 of the apparatus has a fixed guide rail 43 which extends rectilinearly in a transport direction 17 and on which a sliding member 44 can be displaced by a drive in and counter to the transport direction 17. The drive is a linear drive which is not shown in FIGS. 6 to 10, for example, a pneumatic cylinder, a shuttle cylinder, a spindle drive, a toothed rack drive or a belt drive.

A single carrier hook 23 is secured to the sliding member 44 which can be displaced along the guide rail 43 which extends through the entire length of the housing 38. This securing is carried out by means of a bearing housing 45 which is connected to the sliding member 44 in a non-rotatable manner. In this bearing housing 45, the carrier hook 23 is supported so as to be able to be freely rotated about a preferably vertical rotation axis 46. At the lower end of the carrier hook 28 there is a hook-like hanger 47. The bracket hook 20 of the transport bracket 16 which may be configured as described with the first apparatus can be suspended on the hanger 47 of the carrier hook 28, whereby the transport bracket 16 with the textile object which is suspended thereon can be hung on the carrier hook 23 (FIG. 6). In this instance, the bracket hook intersects the hanger 47, whereby the transport bracket 16—with the exception of small play—cannot be rotated or can be rotated only slightly with respect to the carrier hook 23, in particular in the carrier hook 23.

At an upper end of the carrier hook 23 opposite the hanger 47 at the lower end of the carrier hook 23, a rotary arm 48 is arranged in a non-rotatable manner. The carrier hook 23 can be rotated about the vertical rotation axis 46 thereof by the rotary arm 48, to which end the rotary arm 48 can be rotated in a plane which extends perpendicularly to the rotation axis 46 and which is preferably horizontal. A free, outer end of the rotary arm 48 has a scanning means 49. In this instance, this may be a scanning projection, such as, for example, a preferably upright pin which extends parallel with the rotation axis 46, wherein where applicable there is arranged on the pin a freely rotatable roller which surrounds the pin. The roller 50 may be supported on the pin of the scanning means 49 in a sliding manner or with ball bearings.

Preferably, below the ceiling 42 of the housing 38, beside the guide rail 43 of the sliding member 44 a guide 51 for the scanning means 49 is arranged at the free end of the rotary arm 48 of the carrier hook 23. The guide 51 has a control path. In the control path, the scanning means 49 moves in a state guided by the path when the carrier hook 23 is displaced in translation in and counter to the transport direction 17.

In the apparatus shown in FIGS. 6 to 10, the control path is formed by a groove 52 in which the scanning means 49, in particular the roller 50 thereof, engages in a positive-locking manner and thereby in accordance with the extent of the control path, in particular the groove 52 thereof, the scanning means 49 pivots the rotary arm 48 in a selective manner when the carrier hook 23 is moved in the transport direction 17 and in this instance the carrier hook 23 is rotated with the transport bracket 16 and the textile object which is suspended thereon in order to turn it through 180°.

The control path, in particular the groove 52 which forms it, has in order to turn the textile object and to rotate the rotary arm 48 with the carrier hook 23 secured thereto through 180° a specifically configured extent. Accordingly, the control path, in particular the groove 52 which forms it, has such an extent or such a profile that the carrier hook 23 during its initial 90° rotation is rotated increasingly quickly and during the subsequent 90° rotation is rotated increasingly slowly.

The groove 52 has two coherent groove portions 53 and 54. Both groove portions 53 and 54 have a curved, in particular at least quarter-circle-like extent with an inclination which preferably changes progressively in the transport direction 17. When viewed in the transport direction 17, the two groove portions follow each other in a mirror-inverted manner. In this instance, the groove portions 53 and 54 meet at a highest location 55 (FIG. 8). At the highest location 55, both groove portions 53 and 54 which are arranged in a mirror-symmetrical manner with respect to each other are connected to each other so that they merge into each other in a seamless manner and at this location form an upper reversal location of the control path and/or groove 52. In the initial groove portion, the scanning means 49 leads the rotation axis 46. In the subsequent rear groove portion 54, this changes. The scanning means 49 is then located behind the rotation axis 46.

The initial groove portion 53 which begins behind the inlet end 10 has a substantially quarter-circle-like portion. The groove portion 54 which follows in the transport direction 17 is slightly longer in the exemplary embodiment shown. This groove portion 54 has after a similarly quarter-circle-like portion a longer horizontal portion, which extends parallel with the guide rail 43. In this longer rectilinear portion there is a curved portion 56. However, it is conceivable for the groove portion 54 not to have such a curved portion 56 and to also have a shorter rectilinear portion at the end of the groove portion 54.

The longer end portion of the groove portion 54 as shown in the Figure and/or the curved portion 56 serve, after the transport bracket 16 has been turned, to damp vibrations and/or swinging movements of the textile object suspended on the transport bracket 16, that is to say, to calm the textile object after being turned.

The scanning means 49 at the free end of the rotary arm 48 of the carrier hook 23 is configured in such a manner that it passes with little play, but without any force through the control path, in particular the groove 52. Preferably, this is carried out in such a manner that the roller 50 of the scanning means is supported at opposing edges in the groove 52 and/or rolls and/or is guided in a positive-locking manner in both groove portions 53 and 54 of the groove 52.

The turning of the transport bracket 16 with the textile object suspended below is carried out in the apparatus of FIGS. 6 to 10 in two phases which directly and steplessly follow each other of 90° in each case. In FIG. 8, a position of the sliding member 44 is shown with the carrier hook 23 between the two phases. The carrier hook 23 is then rotated through 90° when moving along it by the sliding member 44 on the linear guide rail 23 in the transport direction 17 by the transport bracket with the textile object being currently orientated longitudinally with respect to the transport direction 17. In this instance, the scanning means, in particular the roller 50, is located at the free end of the rotary arm 48 of the carrier hook 23 at the highest location 55 of the groove 52, that is to say, at the transition from the groove portion 53 to the groove portion 54.

When the sliding member 44 and the carrier hook 23 are located in the transfer position, in which a transport bracket 16 with the textile object suspended thereon is suspended with the bracket hook 20 thereof on the hanger 29 of the carrier hook 23, the sliding member 44 with the carrier hook 23 is located in the region of the inlet end 10. That end is the right end of the guide rail 43 with respect to the illustration of FIG. 8. The rotary arm 48 is then located with respect to the illustration of FIG. 8 in a substantially horizontal orientation and the roller 50 is located at the free end of the rotary arm 48 at the end, facing the inlet end 10, of the right groove portion 53. In this position, a transport bracket 16 which has an item of laundry suspended thereon and which is orientated transversely relative to the transport direction 17 can reach the hanger 29 of the carrier hook 23 with the bracket hook 20 thereof.

If the sliding member 44 is now moved onward together with the carrier hook 23 and the rotary arm 48 which is secured in a non-rotatable manner thereto in the transport direction 17 in a linear manner beside the control path, in particular the groove 52, the rotary arm 48 is pivoted into a vertical position until it reaches the highest location of the groove 52 in a clockwise direction (with respect to the illustration of FIG. 8).

By moving the sliding member 44 onward with the carrier hook 23 and the transport bracket 16 which is suspended thereon together with the textile object in the transport direction 17, the rotary arm 48 is pivoted through a further 90° into a horizontal position again. Also in this instance, the transport bracket 16 with the textile object suspended thereon is again rotated through 90° in a clockwise direction.

On the whole, after the scanning means 49 has passed through both groove portions 53 and 54, that is to say, has travelled along the entire groove 52, the carrier hook 23 with the transport bracket 16 and the textile object suspended thereon is rotated through 180°, that is to say, turned, so that another side of the textile object now leads in the transport direction 17.

LIST OF REFERENCE NUMERALS

10 Inlet end
11 Outlet end
12 Beginning
13 Conveyor
14 Conveyor
15 End
16 Transport bracket
17 Transport direction
18 Bracket arm
19 Clamp
20 Bracket hook
21 Rai
22 Carrier hook
23 Carrier hook
24 Housing
25 Ceiling
26 Conveyor chain
27 Drive
28 Bearing housing
29 Hanger
30 Guiding line
31 Rotation axis
32 Rotary member
33 Scanning means
34 Bar
35 Control path
36 Control path
37 Spring
38 Housing
39 Slot
40 Base
41 End face
42 Ceiling
43 Guide rail
44 Sliding member
45 Bearing housing
46 Rotation axis
47 Hanger
48 Rotary arm
49 Scanning means
50 Roller
51 Guide
52 Groove
53 Groove portion
54 Groove portion
55 Location
56 Curved portion

The invention claimed is:

1. An apparatus for rotating textile objects suspended on transport brackets having a circumferential conveyor which has at least one carrier hook for hanging a bracket hook of the respective transport bracket, a continuous conveyor path which can be driven in a circumferential manner in a transport direction and on which the at least one carrier hook is arranged, and a guiding line, on or in which the conveyor path can be moved in a transport direction, wherein the at least one carrier hook is rotatably secured to the conveyor path and in each case has a rotary member which is used to rotate the carrier hook and which corresponds to at least one fixed guide, wherein a plurality of contact or scanning means which are distributed over a rotation range of the carrier hook and which are supported on the guide are associated with a disk member of the rotary member and the at least one guide has at least one control path which is configured to be scanned by alternating contact or scanning means and/or the contact or scanning means are formed by freely rotatable scanning means.

2. The apparatus as claimed in claim 1, wherein the respective carrier hook is supported so as to be able to be freely rotated about a vertical rotation axis in a bearing housing which is secured to the conveyor path.

3. The apparatus as claimed in claim 1, wherein the disk member is located in a plane which intersects a rotation axis of the carrier hook in a perpendicular manner and which extends at least over a rotation range of the transport bracket of at least 90°.

4. The apparatus as claimed in claim 1, wherein the at least one guide and/or the at least one control path is arranged so as to extend parallel beside a portion of the conveyor path which drives and/or moves onward the at least one carrier hook in the transport direction.

5. The apparatus as claimed in claim 4, wherein the at least one control path has along an extent thereof in the transport direction a continuously changing spacing with respect to an adjacent portion of the conveyor path, wherein on the at least one control path, at least one scanning means is supported when passing the or the respective carrier hook on the control path.

6. The apparatus as claimed in claim 1, wherein the at least one carrier hook is rotatingly pretensioned about a rotation axis thereof, and/or at least one support member against the respective guide and/or control path which is temporarily associated therewith.

7. An apparatus for rotating textile objects which are suspended on transport brackets with a carrier hook for suspending a bracket hook of the respective transport bracket and a sliding member which carries the carrier hook and which can be moved back and forth between a transfer position of a transport bracket with a textile object suspended thereon and a discharge position of the transport bracket with the textile object suspended thereon, wherein the carrier hook is rotatingly secured to the sliding member and during a movement from the transfer position into the discharge position and vice versa as a result of at least one guide is subjected to a selectively guided rotation.

8. The apparatus as claimed in claim 7, wherein the carrier hook can be rotated about a vertical rotation axis by at least one control path of the guide through 180° in each case.

9. The apparatus as claimed in claim 7, wherein the carrier hook in a bearing housing which is securely arranged on the sliding member is supported so as to be able to be freely rotated about a vertical axis thereof.

10. The apparatus as claimed in claim 7, wherein the sliding member can be displaced in a guided manner on a fixed guide rail between the transfer and discharge position.

11. The apparatus as claimed in claim 7, wherein a drive of the sliding member is formed by a linear drive.

12. The apparatus as claimed in claim 8, wherein the at least one control path is formed by a groove in which a guide is formed, and/or the groove which forms the control path has two groove portions, wherein the two groove portions which are arranged in a mirror-symmetrical manner meet with ends thereof which are directed toward each other at a highest location of the control path, merge into each other and/or are connected.

13. The apparatus as claimed in claim 7, wherein the carrier hook has at a free upper end thereof a rotary arm for rotating the carrier hook about a rotation axis thereof and/or a free end of the rotary arm is provided with an upright scanning means or scanning projection, which is formed for positive-locking engagement in a control path, and/or the scanning means or the scanning projection is in the form of a pin or a bearing which engages in a groove.

\* \* \* \* \*